United States Patent
Belau et al.

(10) Patent No.: US 7,403,635 B2
(45) Date of Patent: Jul. 22, 2008

(54) DEVICE AND METHOD FOR DETECTION OF AN OBJECT OR A PERSON IN THE INTERIOR OF A MOTOR VEHICLE

(75) Inventors: Horst Belau, Langquaid (DE); Ludwig Ertl, Regensburg (DE); Thorsten Köhler, Deuerling (DE)

(73) Assignee: VDO Automotive AG, Munich (DE)

( * ) Notice: Subject to any disclaimer, the term of this patent is extended or adjusted under 35 U.S.C. 154(b) by 602 days.

(21) Appl. No.: 10/527,250

(22) PCT Filed: Sep. 4, 2003

(86) PCT No.: PCT/DE03/02939

§ 371 (c)(1),
(2), (4) Date: Mar. 9, 2005

(87) PCT Pub. No.: WO2004/026637

PCT Pub. Date: Apr. 1, 2004

(65) Prior Publication Data

US 2006/0120565 A1 Jun. 8, 2006

(30) Foreign Application Priority Data

Sep. 11, 2002 (DE) .............................. 102 41 993

(51) Int. Cl.
*G06K 9/00* (2006.01)
(52) U.S. Cl. ..................................... 382/103
(58) Field of Classification Search ................. 382/103, 382/104, 107
See application file for complete search history.

(56) References Cited

U.S. PATENT DOCUMENTS

| | | | | |
|---|---|---|---|---|
| 5,118,134 A | * | 6/1992 | Mattes et al. | 280/735 |
| 5,157,268 A | * | 10/1992 | Spies et al. | 307/10.1 |
| 5,446,661 A | * | 8/1995 | Gioutsos et al. | 701/45 |
| 5,835,613 A | * | 11/1998 | Breed et al. | 382/100 |
| 5,868,423 A | | 2/1999 | Takimoto et al. | |
| 6,227,564 B1 | | 5/2001 | Ikegami | |
| 6,608,910 B1 | * | 8/2003 | Srinivasa et al. | 382/100 |
| 6,836,714 B1 | | 12/2004 | Nitschke et al. | |
| 2002/0149184 A1 | | 10/2002 | Ertl et al. | |

FOREIGN PATENT DOCUMENTS

DE 40 05 598 A1 8/1991

(Continued)

*Primary Examiner*—Tom Y. Lu
(74) *Attorney, Agent, or Firm*—Laurence A. Greenberg; Werner H. Stemer; Ralph E. Locher

(57) ABSTRACT

The invention relates to a device (1) and method for detection of an object or a person in the interior of a motor vehicle. The device (1) is operated by means of an analytical unit (3), such that the device (1), for detecting an object or a person in the interior of a motor vehicle, comprising a image recording unit (2) and an analytical unit (3) for the image data transmitted from the image recording unit (3), is operated in a first operating mode while an acceleration threshold value is not determined to be exceeded by the analytical unit (3) and in a second operation mode while the acceleration threshold value is determined to be exceeded by the analytical unit (3).

18 Claims, 2 Drawing Sheets

FOREIGN PATENT DOCUMENTS

| | | |
|---|---|---|
| DE | 197 41 393 A1 | 3/1998 |
| DE | 198 52 653 A1 | 5/2000 |
| DE | 199 32 520 A1 | 2/2001 |
| EP | 0 694 003 B1 | 1/1996 |
| JP | 10-100857 | 4/1998 |
| JP | 2000-16230 | 1/2000 |
| JP | 2002104131 A | 4/2002 |
| WO | 01/19648 A1 | 3/2001 |

* cited by examiner

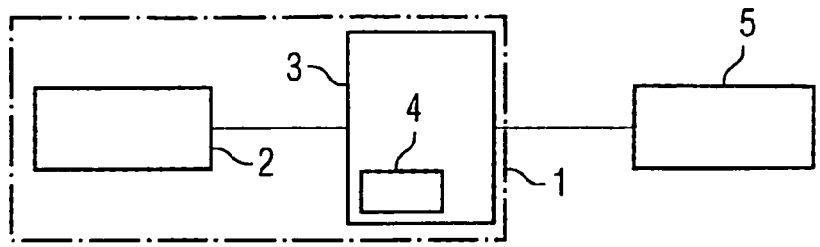
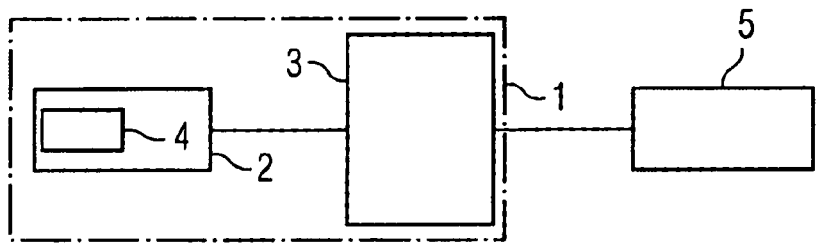
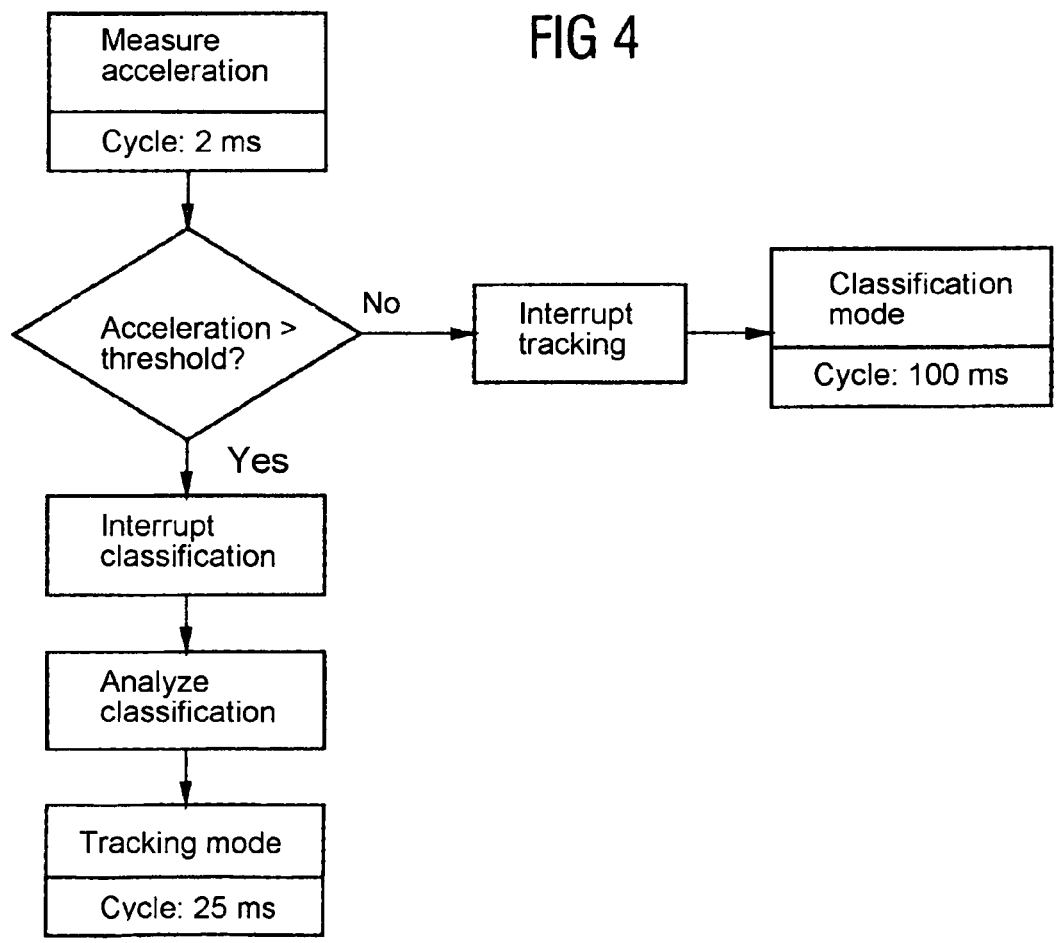

DEVICE AND METHOD FOR DETECTION OF AN OBJECT OR A PERSON IN THE INTERIOR OF A MOTOR VEHICLE

BACKGROUND OF THE INVENTION

Field of the Invention

Device and method for detection of an object or a person in the interior of a motor vehicle.

The invention relates to a device and method for detection of an object or a person in the interior of a motor vehicle.

In a moving motor vehicle fitted with airbags, persons displaced well forward in the direction of the instrument panel and children sitting in a child seat of the Reboard type on the passenger seat are at risk of being injured by the force of the inflating airbag in the event of an accident. In such situations advanced control systems for protecting vehicle occupants make every effort to switch off the airbag or to inflate it with less force in order to remove the risk of injuring a passenger. The preference is for using contactless, optical sensors to determine the positions of the passengers in the vehicle.

Usually a known device for the detection of an object or a person is arranged in the interior of a vehicle as a separate device from the actual control device for protecting vehicle occupants, such that it is possible either to detect a passenger on the vehicle seat or to sample a danger zone in front of the folded airbag. In the latter case the vehicle interior or at least a part thereof is preferably scanned for the presence of an object or a person. If a child seat or part of a passenger's body is detected in this danger zone, the airbag is deployed only gradually or not at all.

Such devices have for example at least one image recording unit and one analytical unit for the data sent by the image recording unit. In the subsequent method, the image recording unit delivers images which in a first operating mode are subjected to identification by sampling or to classification. Classification takes place cyclically in the analytical unit, for example by means of an image processing algorithm. The classes for the data sent by the image recording unit may be for example: large person, small person, child in child seat, arrangement of the child seat, forward or backward facing, object on seat, empty seat, etc.

However, in the first operating mode the analysis involved in classifying the occupancy of, say, a passenger seat is costly. This applies all the more if the whole area observed by the image recording unit(s) is analyzed (from the instrument panel to the seat back and from the seat cushion to the vehicle roof), since this affects computing time, particularly when stereoscopic 3D image processing systems are used. Computing time is also greatly affected if a relatively high resolution is required; if a relatively costly seat occupancy classification is carried out; if the position of the head in the vehicle interior and its distance from the instrument panel are calculated; and/or in each case the whole image area is retrieved from the image recording unit (in the case of stereo this also involves two full images).

In the event of a collision, when the current passenger position must be classified or identified straight away so that deployment of the airbag can be controlled as necessary, means and/or methods of analysis requiring useful time units for position analysis are routinely insufficient to meet the relatively severe requirements, since such units are sometimes unavailable to the control system as reaction time for the protection of vehicle occupants.

A method of alleviating this problem is already known in which, when rapid movement is detected in part of a passenger's body, usually the head, the system switches over to a second operating mode which uses among other things a faster image processing algorithm to track that part of the passenger's body. Known tracking methods have the following properties, either alternatively or cumulatively: analysis of a smaller image area, known as a sub-window, around the position of a defined part of the body; limiting spatial deployment; in most cases discontinuing classification; calculating the position of the part of the body and its distance from the instrument panel, or alternatively, defining a danger zone and merely checking for the intrusion of an object into that zone without calculating distance; and/or lastly restricting the scanning area of the image sensor(s) or recording units thereby saving retrieval time.

Until now the switch from the first operating or classification mode to the second operating or tracking mode has been controlled by the image processing algorithm of the analytical unit itself. However, there is a danger that the part of the passenger's body that needs to be tracked, particularly the head, has already left the restricted zone analyzed in the second operating mode, or that another item such as a loose object has just flown into the zone.

The aforementioned moment of danger is explained below using the example of an acceleration to the head at 10 m/s$^2$ during full braking, or about the same as acceleration due to gravity, and illustrated in FIG. 1.

In this figure the reference character 13 designates a zone known as the COOP ("critical out of position") zone. An airbag 12 arranged in an instrument panel 11 would have to be switched off if the head 17 of a passenger 16 were present in this zone. This zone 13 is typically about 65 cm from the 0 cm rest position of the head 17. The distance to the instrument panel 11 from the 0 cm rest position is typically 80 cm. A device 1 for detecting an object or a person 16 in the interior 10 of a motor vehicle and arranged for example in the roof 14 of the interior 10 of a motor vehicle includes an image recording unit 2, such as a stereoscopic 3D camera system, which transmits the corresponding image data to an analytical unit 3.

Using by way of example an update rate of 100 ms for classification in the first operating mode, the situation in computing terms is then as follows. After 100 ms the analysis is at instant 0 ms, since the analysis itself requires 100 ms. Thus after 100 ms the 3D camera still sees no movement of the head. After 200 ms the analysis is at instant 100 ms. At this instant the 3D camera sees a movement of approx. 5 cm, but at a typical measurement error of +/31 2 cm this is still not significant. After 300 ms the analysis is at instant 200 ms. The camera now detects a significant movement of 20 cm. If a switch to the second operating mode, tracking, took place at that instant, the midpoint of a sub-window would have to be calculated by means of a suitable model in such a way as to set the midpoint at the 45 cm position at that very instant. Even compared to the most recent analysis which is 100 ms old the head has moved on by more than one diameter of a head. Moreover the head will reach the COOP zone within the next analysis cycle. Ideally a message should be sent right now to the airbag control device to deactivate the airbag in approx. 50 ms. For this the measurement results would need to be extrapolated from 20 m to 80 cm—in any event a fourfold increase in the distance covered so far. After 400 ms the analysis is at instant 300 ms. The 3D camera now detects a movement of 45 cm. But the head has actually been in the COOP zone for about 50 ms. Thus at this instant the present position of the head can only be calculated by means of a historic model. The extrapolation for this must be somewhat more than double the distance covered previously.

The values mentioned are recapitulated in the following table for the sake of clarity.

| Time: | Actual head position | Analyzed head position |
|---|---|---|
| 0 ms | 0 cm | — |
| 100 ms | 5 cm | 0 cm |
| 200 ms | 20 cm | 5 cm |
| 300 ms | 45 cm | 20 cm |
| 400 ms | 80 cm | 45 cm |
| 500 ms | 80 cm | 80 cm |

The above example clearly shows that present-day optical image recording units using devices for detecting an object or a person in the interior of a motor vehicle cannot begin detecting the acceleration until some 300 ms after full braking. At this instant, however, it is actually already too late to switch to the second, faster tracking algorithm. Even operating the device exclusively in tracking mode is not possible on a permanent basis, in particular due to heat problems.

SUMMARY OF THE INVENTION

The object of the present invention, starting from the originally mentioned known device and the originally mentioned known method for detecting an object or a person in the interior of a motor vehicle, is therefore to take precautions which enable improved switching between the operating modes of the device, in particular by making this switching occur in more timely fashion.

The part of the object relating to the method is achieved by means of the features which will emerge from Claim 1. The part of the object relating to the device is achieved by means of the features which will emerge from Claim 7. Further advantageous features and embodiments of the invention, which can be used individually or in combination with one another, will emerge from the sub-claims.

The device is operated by means of an analytical unit, such that the device, for detecting an object or a person in the interior of a motor vehicle, comprising an image processing sensor and an analytical unit for the data transmitted from the image processing sensor, is operated in a first operating mode whilst an acceleration threshold value is not determined to be exceeded by the analytical unit and in a second operating mode whilst the acceleration threshold value is determined to be exceeded by the analytical unit.

The analytical unit is preferably designed in such a way that the second operating mode is activated as soon as the value of the motor vehicle acceleration exceeds a threshold and the first operating mode is activated as soon as the value of the vehicle acceleration drops back below a threshold.

Provided a sufficiently fast transmission speed is guaranteed, for instance less than 2 ms, the motor vehicle acceleration values can be referenced by an external airbag control device.

However, as an alternative the device itself to which the invention relates preferably includes an acceleration sensor. This can for example be an integral part of the analytical unit or of the image processing sensor. The transmission rates for the acceleration value are therefore advantageously as small as the error probabilities during data transmission, which may be over a line from the external airbag control device. Integrating the acceleration sensor into the device has the advantage on the one hand that it is independent of the airbag control device and any interference effects. And on the other hand no changes to the commonly used airbag control devices themselves are necessary. A third advantage is that there is no need for any additional data line, any additional utilization of existing data lines or any increase in computing power in order to send the data.

Devices known as sensitive sensors or low G sensors have proved sufficiently suitable for use with the relatively low accelerations that occur during braking, and advantageously are sufficiently reliable in operation, but as cost-effective as the acceleration sensor types normally used for airbag control devices. Insofar as the last-mentioned control devices do not possess such a type of acceleration sensor, the data from the low G sensor can also be made freely available to the airbag control device.

Inventively the second operating mode preferably provides the image recording unit with a sampling range which is more restricted than that of the first operating mode, and advantageously requires less computing time.

Alternatively or cumulatively to the above, the second operating mode also provides the analytical unit with an analysis cycle which is shorter than that of the first operating mode. Due to the shorter cycle time, preferably 25 ms per update, around four times more measured values are available within the same measurement time, so that an extrapolation of the head position can advantageously be made with considerably greater accuracy.

The image recording units used according to the invention are preferably cameras, and preferably stereoscopic 3D cameras. It is also possible, particularly in tracking mode, for an object or the position of a person to be determined with active irradiation of the object or person, preferably by using the methods of transit time measurement or triangulation.

A further embodiment of the method to which the invention relates provides that the value of the motor vehicle acceleration is polled by the analytical unit with preferably a cycle time of 2 ms, or more particularly 1 ms, which advantageously represents a significantly shorter cycle time than in pure image analysis.

In the event of exceeding a threshold value, which according to the invention is preferably about 2 $m/s^2$ and integrated if necessary over an interval of time so as to eliminate interference variables originating from the vehicle, the first operating mode currently running is interrupted in favor of starting the second operating mode, such as rapid head tracking, preferably on the basis of the positional data from the last head position measurement. Since the last head position is at most 100 ms old, as made clear by the example in the introduction to the description, and since the head has not yet experienced any external acceleration, the position will advantageously have changed by considerably less than 5 cm.

On the basis of the measured acceleration values and preferably with the aid of a comparison model, the next head position can then be estimated even more accurately during tracking.

When the threshold value is no longer exceeded the second operating mode currently running is interrupted and the first operating mode is restarted.

The advantages of the invention are in particular that the operating mode of the device can be switched considerably earlier, by some 200 ms to 300 ms, making it more timely. This appreciably increases the operational reliability of the device, since the physical parameter Acceleration is from now on measured directly and need no longer be determined indirectly from measurements of the passenger's position. Due particularly to the timely switching of operating modes, the position of the head for example can be measured in the second operating or tracking mode with significantly greater reliability than before. In addition, because the head is still virtually at rest when tracking starts, the tracking sub-window can be centered accurately on the head or some other part of the body. Lastly, because of the more timely switching of operating modes the head position can be measured with significantly greater accuracy during tracking.

Additional features and further advantages of the invention will be described below in relation to examples of preferred exemplary embodiments and the accompanying drawings.

These contain the following diagrams:

BRIEF DESCRIPTION OF THE DRAWING

FIG. 2 the device to which the invention relates, having an acceleration sensor arranged within the analytical unit; and FIG. 3 the device to which the invention relates, having an acceleration sensor arranged within the image recording unit; and FIG. 4 a flowchart of the method to which the invention relates.

DESCRIPTION OF THE PREFERRED EMBODIMENTS

Figure 1:
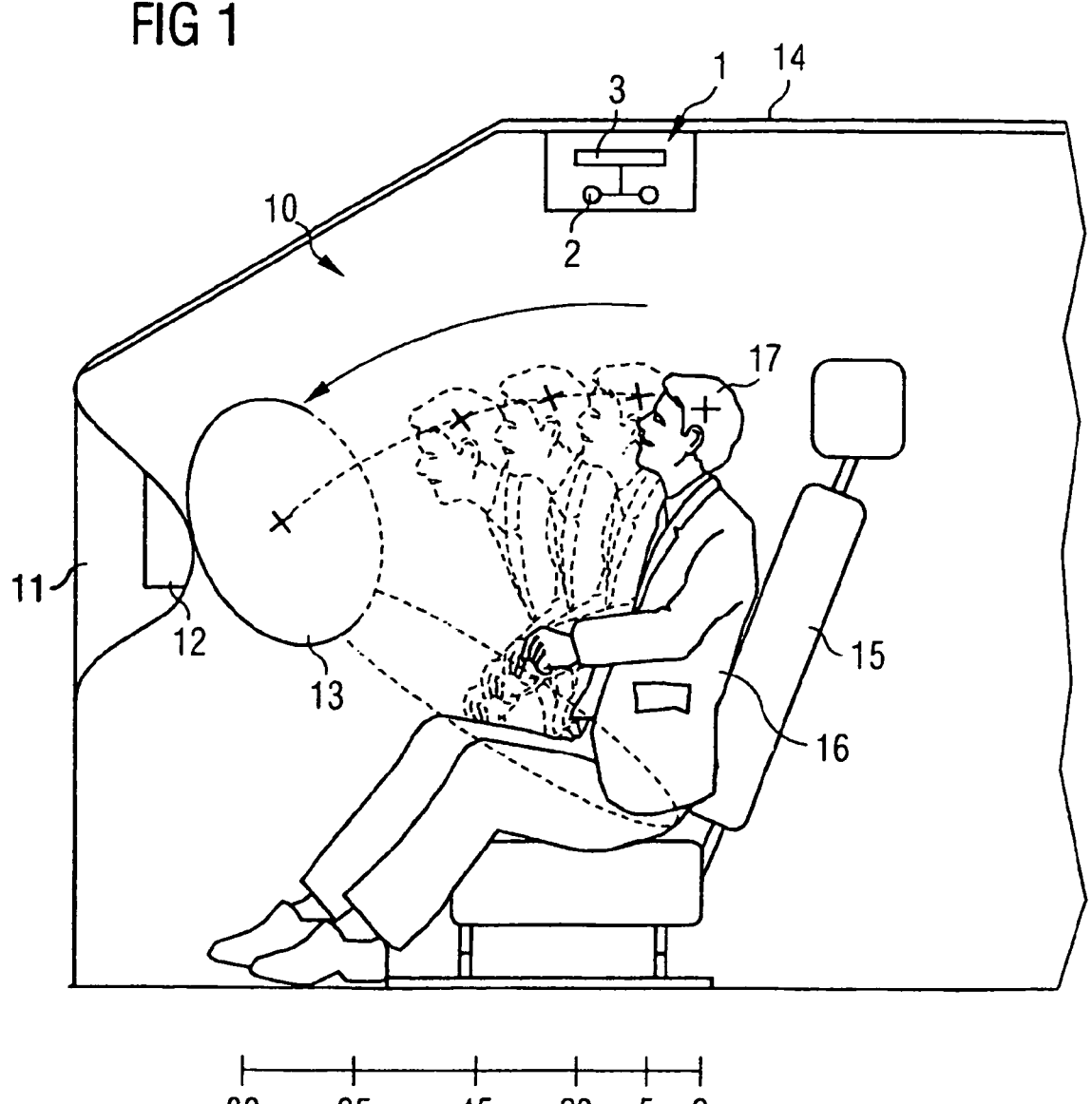
FIG. 1 the forward displacement of a passenger's head during braking.
Figure 1:
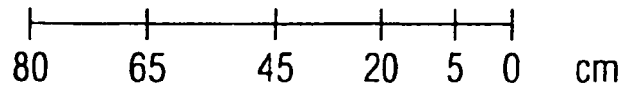

FIG. 1 is a diagram showing the forward displacement of a passenger's head in the course of braking, from a rest position at 0 cm toward an instrument panel. An arrow shows the forward displacement direction and a dimension line identifies the individual forward displacement positions. In order to avoid repetition, information on the meaning, sequence and problems of forward displacement should be obtained by referring to the introductory description.

FIG. 2 shows the inventive device 1 with an image recording unit 2 and an analytical unit 3 for the image data transmitted from the image recording unit 2. The analytical unit 3 is connected to an external airbag-control unit 5 for the protection of vehicle occupants. According to the invention the analytical device 3 preferably includes an acceleration sensor 4.

FIG. 3 shows the inventive device 1 with an image recording unit 2 and an analytical unit 3 for the data transmitted from the image recording device 2. The analytical unit 3 is connected to an external airbag-control unit 5. Unlike the typical embodiment according to FIG. 2, an acceleration sensor 4 is now an integral part of the image recording device 2.

FIG. 4 shows a flowchart of the method to which the invention relates. Values for the vehicle acceleration are polled by the analytical unit 3 with a cycle time of 1 ms to 2 ms. If these values exceed a threshold value S, which can be filtered as necessary and is preferably around 2 m/s$^2$, the classification cycle currently running is interrupted and rapid head tracking is immediately started on the basis of the positional data from the last head position measurement. Since the last head position is at most 100 ms old and the head has not yet experienced any external acceleration, its position will have changed by considerably less than 5 cm. On the basis of the measured acceleration values and with the aid of a model, the next head position can then be estimated even more accurately during tracking. When the acceleration ends, the head will continue to move at its constant maximum speed or slow down. When a threshold speed is no longer exceeded the system can be switched back to the classification mode.

In contrast to the prior art disclosed by document EP 0 694 003 B1 or DE 40 05 598 A1 for example, according to which an acceleration signal from an airbag control device together with a measured movement of the passenger during a crash is used to define the deployment of an airbag, the present invention advantageously makes use of the idea of using an acceleration signal to switch between the different operating modes of a device for detecting an object or a person in the interior of a motor vehicle. For this the invention analyzes not just crash signals as in the documents mentioned above, but also acceleration signals such as those which occur during harsh braking, and transmits them to an airbag control device so that they can be advantageously processed for the protection of vehicle occupants.

The invention claimed is:

1. A method of detecting an object or a person in the interior of a motor vehicle, which comprises:
    providing an image recording unit for detecting an object or a person in the interior of the motor vehicle and an analytical unit for image data transmitted from the image recording unit;
    operating the image recording unit and the analytical unit:
        in a first operating mode implementing a first image processing algorithm when said analytical unit determines that an acceleration threshold value is not exceeded; and
        in a second operating mode implementing a second image processing algorithm that is faster than the first image processing algorithm when said analytical unit determines that the acceleration threshold value is exceeded, the second operating mode taking over on a basis of positional data of a last measurement obtained in the first operating mode.

2. The method according to claim 1, which comprises polling a value of a motor vehicle acceleration with the analytical unit with a cycle time of approximately 2 ms.

3. The method according to claim 1, which comprises polling a value of a motor vehicle acceleration with the analytical unit with a cycle time of approximately 1 ms.

4. The method according to claim 1, which comprises setting the acceleration threshold value to approximately 2 m/s$^2$.

5. The method according to claim 1, which comprises estimating a next position of the object or the person in the second operating mode on a basis of the measured acceleration values by way of a comparison model.

6. The method according to claim 1, which comprises, when the threshold value is no longer exceeded, interrupting a currently running second operating mode and restarting the first operating mode.

7. The method according to claim 1, which comprises, upon exceeding the threshold value, interrupting a currently running first operating mode and starting the second operating mode.

8. A device for detecting an object or a person in an interior of a motor vehicle, comprising:
    an image recording unit disposed to detect an object or a person in the interior of the motor vehicle;
    an analytical unit configured to receive data from said image recording unit; and
    the device being configured to be operated:
        in a first operating mode implementing a first image processing algorithm while a defined acceleration threshold value is determined not to be exceeded by said analytical unit; and
        in a second operating mode implementing a second image processing algorithm that is faster than the first image processing algorithm while the acceleration threshold value is determined to be exceeded by the analytical unit.

9. The device according to claim 8, wherein said analytical unit is configured to activate the second operating mode as soon as a value of a motor vehicle acceleration exceeds the acceleration threshold value.

10. The device according to claim 8, wherein said analytical unit is configured to activate the first operating mode as soon as a value of a motor vehicle acceleration drops below the acceleration threshold value.

11. The device according to claim 8, wherein said analytical unit is configured to reference values for a motor vehicle acceleration from an external airbag control unit.

12. The device according to claim 8, which further comprises an acceleration sensor for determining an acceleration of the motor vehicle.

13. The device according to claim 12, wherein said acceleration sensor forms an integral part of said analytical unit or of said image recording unit.

14. The device according to claim 12, wherein said acceleration sensor is a sensor sensitive for relatively low accelerations.

15. The device according to claim 8, wherein said image recording unit has a more restricted sampling range in the second operating mode than a sampling range in the first operating mode.

16. The device according to claim 8, wherein said analytical unit has a shorter analysis cycle in the second operating mode than an analysis cycle in the first operating mode.

17. The device according to claim 8, wherein said image recording unit is a camera.

18. The device according to claim 8, wherein said image recording unit is a stereoscopic 3D camera.

\* \* \* \* \*